United States Patent Office 2,906,771
Patented Sept. 29, 1959

2,906,771

PRODUCTION OF COMPLEXES OF BORON TRIFLUORIDE

Peter R. Girardot, Middleton, and Robert R. Walters, Fitchburg, Wis., assignors to Callery Chemical Company, Pittsburgh, Pa., a corporation of Pennsylvania No Drawing. Application August 4, 1955
Serial No. 526,551

8 Claims. (Cl. 260—462)

This invention relates to the provision of available boron trifluoride in the form of ternary complexes of $BF_3$.

Boron trifluoride ($BF_3$) is useful for various purposes. For instance, it is a valuable catalyst in a variety of reactions examples of which are alkylation, isomerization and polymerization. It is used also to produce diborane ($B_2H_6$) and other boron hydrides by reaction with, for instance, sodium borohydride ($NaBH_4$) or sodium hydride (NaH). For such and other purposes this reagent is commonly used in the form of a complex, or co-ordination compound, with an ether or an alcohol, for ease of handling and metering as compared with its use in the simple gaseous state.

The complexes of boron trifluoride and ethers just referred to are made conventionally by passing gaseous $BF_3$ into the ether. The production and handling of gaseous boron trifluoride according to the classical and commercial methods is disadvantageous and objectionable from various standpoints such, for example, as relatively low yields based on the starting materials, the necessity for special techniques, and the requirements of special equipment and unusual precautions necessitated by the highly reactive and toxic character of boron trifluoride. It is, accordingly, desired to have simpler and safer methods of providing boron trifluoride in a form in which it is more easily prepared and handled.

It is among the objects of this invention to provide a method of making boron trifluoride mixed complexes that is simple, easily and safely practiced, results in high yields, and avoids disadvantages of prior methods of making these compounds.

A further object is to provide a method of making such complexes from alcohol complexes of boron trifluoride.

The term "mixed complexes" as used herein contemplates products in which boron trifluoride is complexed with one molecule each of at least two other compounds. Such mixed complexes may consist of $BF_3$, an alcohol and an ether, $BF_3$, water and an alcohol. For many purposes it is preferred that the alcohol be a lower alkyl alcohol, e.g., methyl, ethyl, propyl or butyl. Likewise the ethers may be the simple or mixed lower alkyl ethers, or polyglycol polyalkyl ethers. Examples of these mixed complexes of $BF_3$ or $BF_3.CH_3OH.H_2O$, $BF_3.CH_3OH(C_2H_5)_2O$, $BF_3.CH_3OH.C_4H_8O_2$ (dioxane), and $BF_3.CH_3OH.CH_3O(C_2H_4O)_2CH_3$ (diethylene glycol dimethyl ether). Many other mixed complexes in accordance with our invention may be made from such compounds as water, ammonia, amines, amides, hydrazine, substituted hydrazines, alcohols, organic acids, ethers, esters, aldehydes, ketones and acetals.

We have discovered, and it is upon this that the invention is in large part predicated, that such boron trifluoride mixed complexes may be produced readily by reacting a boron trifluoride alcohol complex with the desired other complexing agent. The reaction proceeds readily and smoothly to give good yields of the mixed complex, which may even be quantitative. The reaction conditions are not critical, and for most purposes it suffices to conduct the reaction at the reflux temperature. Complexing may proceed in either of two ways. Thus, one molecule of a complex (e.g. $BF_3.2CH_3OH$ or $BF_3.2H_2O$) may be replaced by one of another complexing agent, or a molecule of a second agent that may add to a $BF_3$ complex capable of complexing with a further agent.

In the practice of the invention it is preferred to use the di-lower alkyl alcohol complexes such, for example, as the boron trifluoride complexes with methyl, ethyl, propyl or butyl alcohols.

As an example of the practice of the invention, reference may be made to the production of boron trifluoride-methyl alcohol-ethyl etherate [$BF_3.CH_3OH.(C_2H_5)_2O$] from boron trifluoride dimethanol complex ($BF_3.2CH_3OH$)

In one test 26.4 gm. of $BF_3.2CH_3OH$ and 14.8 gm. of dry $(C_2H_5)_2O$ were mixed. When the reaction subsided the mixture was distilled. After removal of ether there was recovered $BF_3.CH_3OH.(C_2H_5)_2O$ as a fuming liquid of B.P. 120° to 130° C. (1 atm.).

The boron fluoride di-methanol complex is a strongly acidic liquid boiling at 58° to 59° C. at 4 mm. It may be produced in a variety of ways, for instance by reacting sodium fluoborate ($NaBF_4$), hydrochloric acid and trimethyl borate in the presence of methanol, as disclosed and claimed in a copending application filed by Peter R. Girardot and Robert R. Walters, the present applicants, and others, being Serial No. 526,552, filed August 4, 1955, now Patent No. 2,855,440. Boron trifluoride di-methanol complex and related alcohol complexes may be produced easily likewise by reacting a lower trialkyl borate and hydrogen fluoride, as disclosed in a copending application filed by William H. Schechter, being Serial No. 509,389, filed May 18, 1955.

Although the invention has been exemplified with reference to the diethyl etherate, ether complexes of boron trifluoride may be produced similarly from ethers generally, such as the simple and mixed alkyl ethers. However, other types of ether may be used in the same way such, for example, as polyglycol polyalkyl ethers, typical examples being diethylene glycol dimethyl ether, triethylene glycol diethyl ether, triethylene glycol dimethyl ether, and the like. Experience has shown that the dimethanol complex cannot be satisfactorily converted directly to a polyglycol ether complex. We have discovered, however, that such complexes are formed from boron trifluoride etherates. An etherate such as the diethyl etherate, $BF_3.(C_2H_5)_2O$, is treated with the polyglycol ether with displacement of one mole of the simple ether by one of the polyglycol ether, and the displaced alkyl ether may then be removed by distillation. In this way, by forming an intermediate lower dialkyl ether complex, a polyglycol polyalkyl etherate of boron trifluoride can be formed.

As a further example, 1.8 gm. of water was added to 13.2 gm. of $BF_3.2CH_3OH$ at 0° C. The solution was warmed to room temperature and then 3.2 gm. of $CH_3OH$ was stripped off at 5 to 10 mm. pressure. The residue was then distilled at 57° C. and 5 mm. pressure with recovery of a 90 percent yield of $BF_3.CH_3OH.H_2O$.

Exemplifying complexes with more than two complexing agents, 6 gm. of $BF_3.CH_3OH.H_2O$ were added with stirring to a mixture of 5 gm. of dioxane ($C_4H_8O_2$) and 15 gm. of petroleum ether. The resulting precipitate was separated, washed with petroleum ether, dissolved in dioxane, and recrystallized from a dioxane-petroleum ether mixture to produce $BF_3.CH_3OH.H_2O.C_4H_8O_2$, M.P. 140° to 141° C.

The following examples are further illustrative of the wide scope of complexes that may be formed in the practice of the invention.

26.4 gm. of $BF_3 \cdot 2CH_3OH$ was refluxed with a large excess of methyl borate for 1.5 hours. Distillation at atmospheric pressure gave a mixture of methyl borate and the methyl borate-methanol azeotrope. The residue on distillation at 62° C. and 3 mm. pressure gave a liquid containing $BF_3 \cdot CH_3OH \cdot B(OCH_3)$. $CH_3OH-B(OCH_3)_3$ azeotrope may be used instead of the borate.

26.4 gm. of $BF_3 \cdot 2CH_3OH$ were added slowly to 24.2 gm. of dimethyl aniline while keeping the temperature below 60° C. The mixture was refluxed 11.5 hours followed by stripping all material boiling below 85° C. at 7 mm. pressure. A substantially 100 percent yield of very hygroscopic $BF_3 \cdot CH_3OH \cdot C_6H_5N(CH_3)_2$ was obtained. Dilower alkyl aniline in general can be similarly used.

As yet another example, 5 gm. of $BF_3 \cdot 2CH_3OH$ were added to 6 gm. of dioxane in petroleum ether. The precipitate that formed was recrystallized from dioxane-petroleum ether and was $BF_3 \cdot 2CH_3OH \cdot C_4H_8O_2$, M.P. 136° to 138° C.

These mixed complexes with boron trifluoride are useful for various purposes, for example as catalysts or to supply $BF_3$, for instance by pyrolysis of their combinations with various metal salts.

According to the provisions of the patent statutes, we have explained the principle of our invention and have described what we now consider to represent its best embodiment. However, we desire to have it understood that, within the scope of the appended claims the invention may be practiced otherwise than as specifically described.

We claim:

1. That method which comprises mixing and reacting a complex of boron trifluoride and a lower alkyl monohydric alcohol, said trifluoride and alcohol being present in said complex in a mol ratio of 1 to 2, with another complexing agent selected from the group consisting of dioxane, dilower alkyl aniline, lower alkyl ethers and lower alkyl borates, and thereby converting said complex to a mixed complex of boron trifluoride with the alcohol and said other complexing agent, and recovering the mixed complex from the reaction mixture.

2. A method in accordance with claim 1 in which said other complexing agent is dimethyl aniline.

3. A method in accordance with claim 1 in which said other complexing agent is trimethyl borate.

4. A method in accordance with claim 1 in which heat is applied upon mixing said complex and said other complexing agent.

5. That method comprising mixing and reacting a complex of boron trifluoride and a lower alkyl monohydric alcohol, said trifluoride and alcohol being present in mol ratio of 1 to 2, with a lower alkyl ether and thereby converting said complex to a mixed complex of boron trifluoride with the alcohol and said ether, and recovering said mixed complex from the reaction mixture.

6. A method according to claim 5, the ether being diethyl ether.

7. That method comprising mixing and reacting $BF_3 \cdot 2CH_3OH$ with diethyl ether, and recovering the resulting mixed complex of boron trifluoride, methanol and diethyl ether from the reaction mixture.

8. A method according to claim 7 in which the mixed complex is further reacted with a polyethylene glycol dialkyl ether, and a ternary complex of boron trifluoride, methanol, and the polyethylene glycol dialkyl ether is recovered.

References Cited in the file of this patent

UNITED STATES PATENTS 2,769,840    Sowa _____ Nov. 6, 1956

OTHER REFERENCES

Greenwood et al.: Quarterly Reviews (London), vol. 8, pages 1–39, 1954 (only pages 15 and 16 relied on).